US010325219B2

(12) United States Patent
Petrov

(10) Patent No.: US 10,325,219 B2
(45) Date of Patent: Jun. 18, 2019

(54) PARALLEL RETRIEVAL OF TRAINING DATA FROM MULTIPLE PRODUCERS FOR MACHINE LEARNING SYSTEMS

(71) Applicant: Facebook, Inc., Menlo Park, CA (US)

(72) Inventor: Alexander Viktorovich Petrov, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 956 days.

(21) Appl. No.: 14/335,731

(22) Filed: Jul. 18, 2014

(65) Prior Publication Data

US 2016/0019469 A1  Jan. 21, 2016

(51) Int. Cl.
*G06F 9/46* (2006.01)
*G06F 16/25* (2019.01)
*G06N 20/00* (2019.01)

(52) U.S. Cl.
CPC .............. *G06N 20/00* (2019.01); *G06F 9/46* (2013.01); *G06F 16/254* (2019.01)

(58) Field of Classification Search
None
See application file for complete search history.

(56) References Cited

U.S. PATENT DOCUMENTS 5,212,765 A * 5/1993 Skeirik ................ G05B 13/027
  417/44.2
7,020,642 B2 * 3/2006 Ferguson ............. G05B 13/048
  700/53
2012/0191631 A1 * 7/2012 Breckenridge ...... G06N 99/005
  706/12

OTHER PUBLICATIONS

Wikipedia page for Thread (Computing) published Apr. 2014, URL: https://web.archive.org/web/20140402005222/http://en.wikipedia.org/wiki/Thread_(computing).*
Stack Overflow, published Apr. 2013, URL: http://stackoverflow.com/questions/1073098/parallel-coding-vs-multithreading-on-single-cpu.*
Wikipedia page for Support vector machine, downloaded Mar. 5, 2017, URL: https://en.wikipedia.org/wiki/Support_vector_machine.*

* cited by examiner

*Primary Examiner* — Robert A Cassity
*Assistant Examiner* — Michael Zidanic
(74) *Attorney, Agent, or Firm* — Fenwick & West LLP

(57) ABSTRACT

A sorting engine is an intermediary layer between a multi-threaded engine that obtains batches of training data from the producers in parallel and the underlying machine learning engine. The sorting engine includes a shared buffer that has various slots for storing batches of training data, where the slots are organized in a deterministic order associated with the producers. A batch of training data obtained by a thread from a given producer may be stored only in a corresponding slot in the shared buffer. Further, the sorting engine transmits the batch to the machine learning engine only when a previous batch in the deterministic order has been transmitted from the shared buffer to the machine learning engine.

18 Claims, 5 Drawing Sheets

US 10,325,219 B2

PARALLEL RETRIEVAL OF TRAINING DATA FROM MULTIPLE PRODUCERS FOR MACHINE LEARNING SYSTEMS

BACKGROUND

This invention relates generally to providing training data to a machine learning system.

Machine learning systems typically require vast amounts of training data when building inference models. Often such training data is distributed by a training data producer to the machine learning system as a single stream of data. A single stream distribution model, however, is bottlenecked by the speed of the training data producer. When vast amounts of data are required, the slow distribution rate of the training data in turn slows down the machine learning system.

To address the slow distribution rate of a single stream, some systems distribute training data to the machine learning system in parallel. This parallel distribution model, however, does not preserve the order of the training data distribution over multiple iterations of the machine learning system. Varying the order of training data distribution has undesirable downstream effects in machine learning systems.

SUMMARY

By maintaining a deterministic order of training data obtained from multiple training data producers, a system that trains machine learning models provides increased accuracy in an underlying machine learning engine. A sorting engine is an intermediary layer between a multi-threaded engine and the underlying machine learning engine. The sorting engine obtains batches of training data from the training data producers in parallel. The sorting engine includes a shared buffer that has various slots for storing batches of training data. The slots are organized in a deterministic order associated with the producers.

The sorting engine stores a batch of training data obtained by a thread from a given producer in a corresponding slot in the shared buffer. When the corresponding slot is unavailable, the sorting engine blocks the thread until the batch currently stored in the slot is transmitted to the machine learning engine. The sorting engine transmits a given batch to the machine learning engine when a previous batch in the deterministic order has been transmitted from the shared buffer to the machine learning engine. As the slots are emptied, the next batches of training data are added to their corresponding slots, and this process can continue until all training data has been read.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
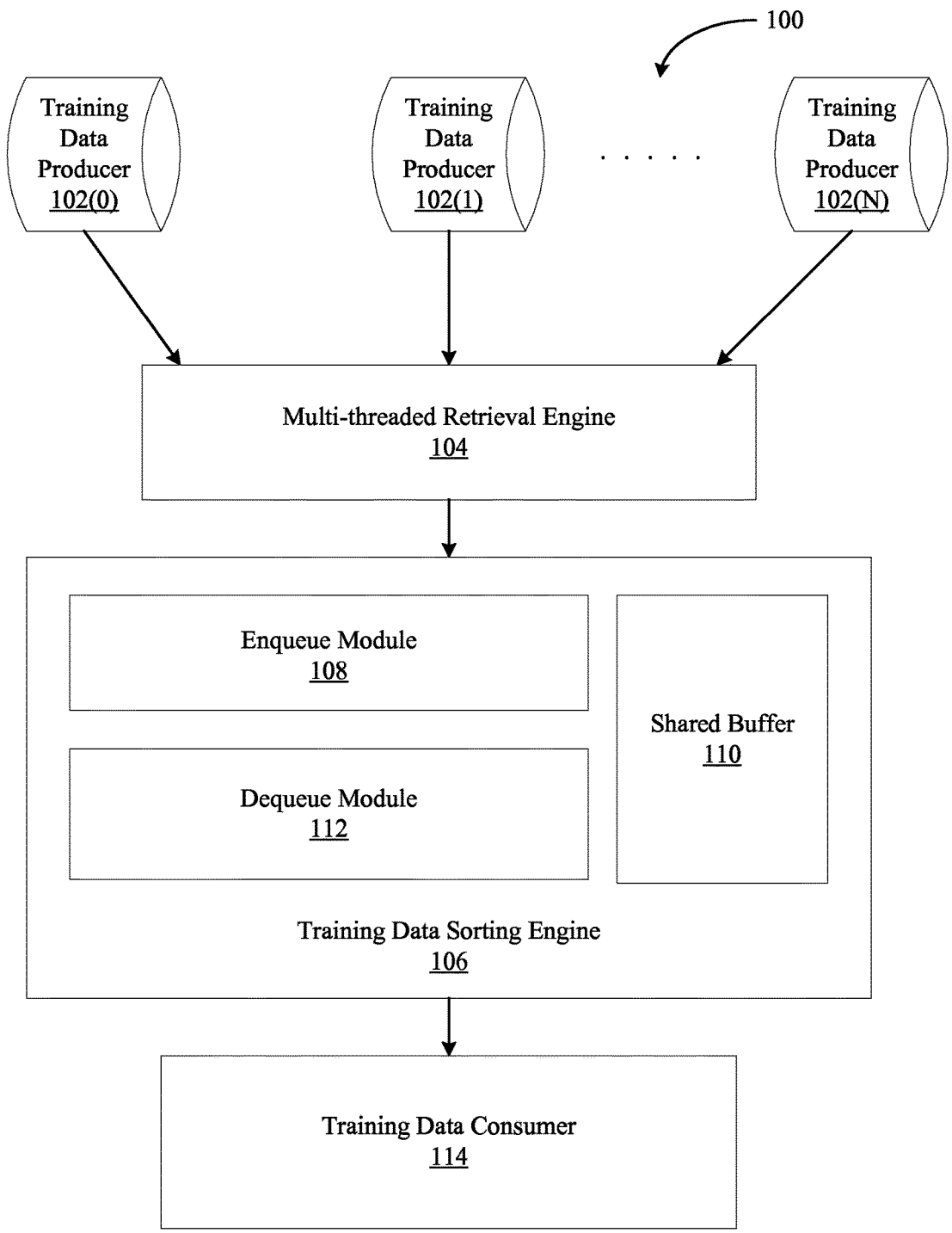
FIG. 1 is a high level block diagram of a system environment for a machine learning system in accordance with an embodiment.

FIG. 1 is a high level block diagram of a system environment 100 for a machine learning system. The system environment 100 includes training data producer 102(0), (102(1), and 102(N), collectively training data producers 102, a multi-threaded retrieval engine 104, a training data sorting engine 106, and a training data consumer 114. In alternative configurations, different and/or additional components may be included in the system environment 100. The embodiments described herein can be adapted to systems that are not machine learning systems.

Machine learning systems rely on vast amounts of training data to infer statistical relationships between the presence or absence of features of the data and a particular outcome. The training data producers 102 store training data that can be consumed by one or more downstream training data consumers, such as training data consumer 114, for inferring these statistical relationships. Each of the training data producers 102 may be a file, a database, or any other storage mechanism that is programmatically accessible. A unit of training data stored in a training data producer 102 is referred to herein as a training record. Training records in one training data producer 102 may be of a different type relative to training records in a different data producer 102.

The multi-threaded retrieval engine 104 concurrently obtains batches of training records from at least a subset of the training data producers 102. In operation, the multi-threaded retrieval engine 106 is configured with a set of execution threads. Each thread obtains a batch of training records from a data producer 102, optionally performs one or more processing steps on the batch, and provides the processed batch to the training data sorting engine 106 for temporary storage. In one embodiment, the training data producers 102 are remote from the multi-threaded retrieval engine 106 such that the threads obtain the batches over a network.

Each batch of training records may include the same or substantially similar number of training records. Further, each batch of training records is associated with a producer index that indicates the particular producer from which the batch was obtained and a batch index that indicates the storage location within the particular data producer 102 from which the batch was obtained. In one embodiment, each thread is assigned to a particular data producer 102. In such an embodiment, a thread continually obtains batches of training records from the assigned data producer 102 until all of the training records from the data producer 102 have been obtained.

The rate at which the multi-threaded retrieval engine 106 obtains batches of training records from a particular training data producer 102 depends on the speed of the producer itself. As a result, a thread may retrieve a given batch of training records from a training data producer 102 faster than another thread retrieving a batch of training records from a different training data producer 102. Because of the varying retrieval rates across different training data producers 102, the order in which batches of training records are obtained by multiple threads is non-deterministic.

Batches of training records from the training data producers 102 may be used over multiple iterations of the machine learning system. While the order of the batches is not necessarily important in a single iteration of the machine learning system, the order may become vital over multiple iterations of the system. Specifically, a different order of the batches in a subsequent iteration of the machine learning system may lead to inconsistent results from a previous iteration or may affect the statistical relationships inferred by the machine learning system over time. Therefore, when multiple batches of training records are being obtained in parallel from the training data producers 102, maintaining a deterministic order of the batches may become essential. The deterministic order may be associated with the training data producers 102, such that a batch of training records from each of the training data producers is interleaved serially with the other batches. For example, for batches A and B obtained from data producers 102(0), batch C obtained from data producer 102(1), and batch D obtained from data producer 102(3), respectively, the order of the batches is maintained as A, C, D, B regardless of the order in which those batches are obtained.

The training data sorting engine 106 (also referred to as "the sorting engine 106") sorts and temporarily stores batches of training records until the batches can be released to the training data consumer 114 in a deterministic order. The sorting engine 106 includes an enqueue module 108, a shared buffer 110, and a dequeue module 112. The enqueue module 108 receives batches of training records obtained from the training data producers 102 by the multithreaded retrieval engine 104 and enqueues the batches in the shared buffer 110 in a deterministic order. The dequeue module 108 dequeues batches from the shared buffer 110 and transmits those batches to the training data consumer 114. The batches transmitted to the training data consumer 114 have a deterministic order by virtue of the how those batches are stored in the shared buffer 110. Details related to enqueuing/dequeueing batches in the shared buffer 110 are provided below.

Parallel Retrieval and Sorting of Training Data Records

The enqueue module 110 is configured with three parameters: (1) a total number of training data producers 102 from which training data is to be obtained, (2) a maximum number "C" of training data producers 102 from which batches of training records can be obtained concurrently, and (3) a maximum number "K" of batches that may be concurrently stored in the shared buffer for each training data producer. In some embodiments, only one batch may be stored for each training data producer. In such embodiments, the value of K would be equal to "1." The enqueue module 110 initializes the shared buffer 110 based on the values of parameters C and K such that the shared buffer 110 includes K slots for each of C training data producers 102. In one embodiment, the shared buffer 110 is implemented as a circular buffer.

Figure 2:
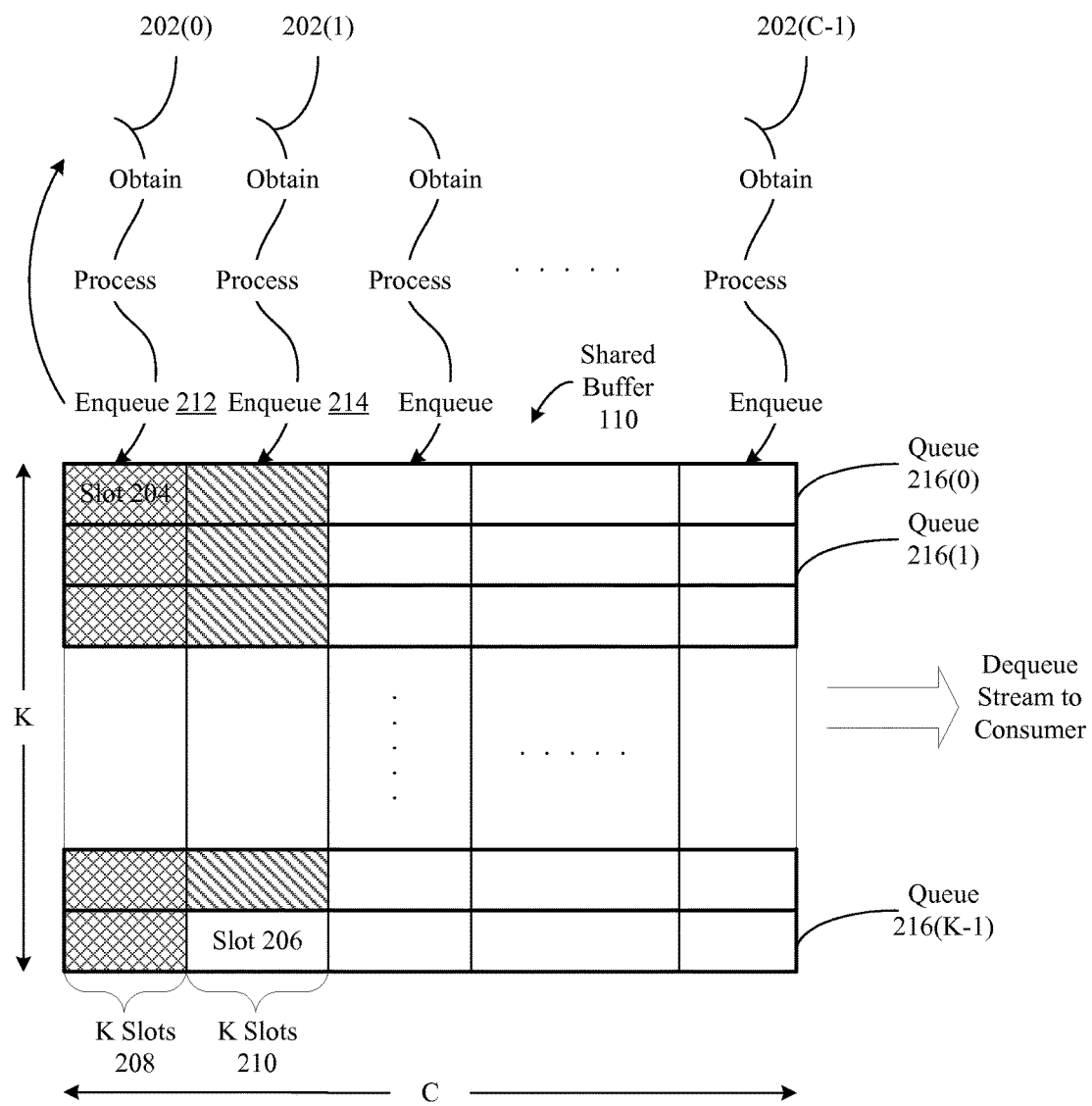
FIG. 2 illustrates an exemplary shared buffer having a number of slots for each of a number of training data producers in accordance with an embodiment.

FIG. 2 illustrates an exemplary shared buffer 110 having K slots for each of C training data producers 102 in accordance with an embodiment. Each set of K slots is associated with a different training data producer 102 from which training data is currently being obtained by the multi-threaded engine 104. For example, K slots 208 are associated with the data producer 102(0). A batch of training data obtained from a particular data producer 102 may be stored in a slot associated with the producer 102. Further, each data producer 102 is assigned a starting slot index in the set of K slots where a first batch of training data obtained from the data producer 102 is stored. Once a batch of training data is stored in a slot, the slot becomes unavailable until the batch is transmitted to the training data consumer 114 (also referred to as "the data consumer 114" or "the consumer 114").

In operation, once a thread in the multi-threaded retrieval engine 104 obtains and processes a batch of training records, the thread requests the enqueue module 108 to enqueue the batch in the shared buffer 110 for eventual transmission to the training data consumer 114. The request includes the producer index and the batch index associated with the batch. Again, the producer index indicates the particular producer from which the batch was obtained, and the batch index that indicates the storage location within the particular data producer from which the batch was obtained. In one embodiment, the thread issues the enqueue request via an enqueue function that takes the batch, the producer index, and the batch index as inputs.

Upon receiving the enqueue request from the thread, the enqueue module 108 identifies the data producer 102 associated with the batch based on the producer index. The enqueue module 108 also identifies the K slots in the shared buffer 110 that are associated with the identified data producer 102. The enqueue module 108 then determines whether the slot in the K slot corresponding to the batch is available. In one embodiment, the index of the slot corresponding to the batch is determined using the following formula:

$$S_i = (C(x+y) + C(B_i)) \bmod (C \times K)$$

where $S_i$ is the index of the slot in the K slots corresponding to the batch, $B_i$ is the batch index associated with the batch, C is the number of training data producers, K is the maximum number of batches that may be concurrently stored in the shared buffer 110 for each training data producer, x is the index (0-K) of the K slots assigned to the identified data producer 102, and y is starting slot index in the set of K slots assigned to the identified data producer 102.

When the slot associated with slot index $S_i$ is available, the enqueue module 108 writes the batch obtained by the thread to the available slot. Once the batch is written, the thread is free to obtain additional batches of the training records from the data producer 102. For example, in FIG. 2, the thread 202(1) transmits an enqueue request 214 for enqueuing a batch of data associated with data producer 102(1). The data producer 102(1) is in turn associated with K slots 210. Because slot 206 is available, the enqueue module 108 writes the batch to slot 206. Thread 202(1) is free to obtain additional blocks from data producer 102(1).

When the slot associated with slot index $S_i$ is unavailable, the enqueue module 108 blocks the thread until the slot becomes available. Once the slot becomes available, the enqueue module 108 writes the batch to the slot and unblocks the thread. For example, in FIG. 2, the thread 202(0) transmits an enqueue request 212 for enqueuing a batch of data associated with data producer 102(0). The data producer 102(0) is in turn associated with K slots 208, and the batch in particular corresponds to slot 204 in the K slots 208. Because slot 204 is unavailable, the enqueue module 108 blocks thread 202(0) until slot 204 becomes available. Slot 204 will become available at a later time when the batch stored at slot 204 is transmitted to the training data consumer 114.

The enqueuing process described above for each batch of data obtained by the threads in the multi-threaded retrieval engine 102 is repeatedly performed until all of the training data records are obtained from each of the training data producers 102 and stored in the shared buffer 110 and/or transmitted to the training data consumer 114. In some scenarios, the number of training data producers 102 from which batches can be obtained concurrently may be less than the total number of training data producers 102. In such scenarios, when all of the training data records have been obtained from a given training data producer 102, the multi-threaded retrieval engine 102 begins obtaining batches of training data from a new training data producer 102 from which batches have not yet been obtained. In one embodiment, the enqueue module 108 may block a thread that has obtained a batch from the new training data producer until all of the training data records from the current data producers 102 have been obtained. In such an embodiment, the enqueue module 108 writes dummy batches of data to the K slots associated with the data producer 102 from which all of the training data have been obtained.

Figure 3:
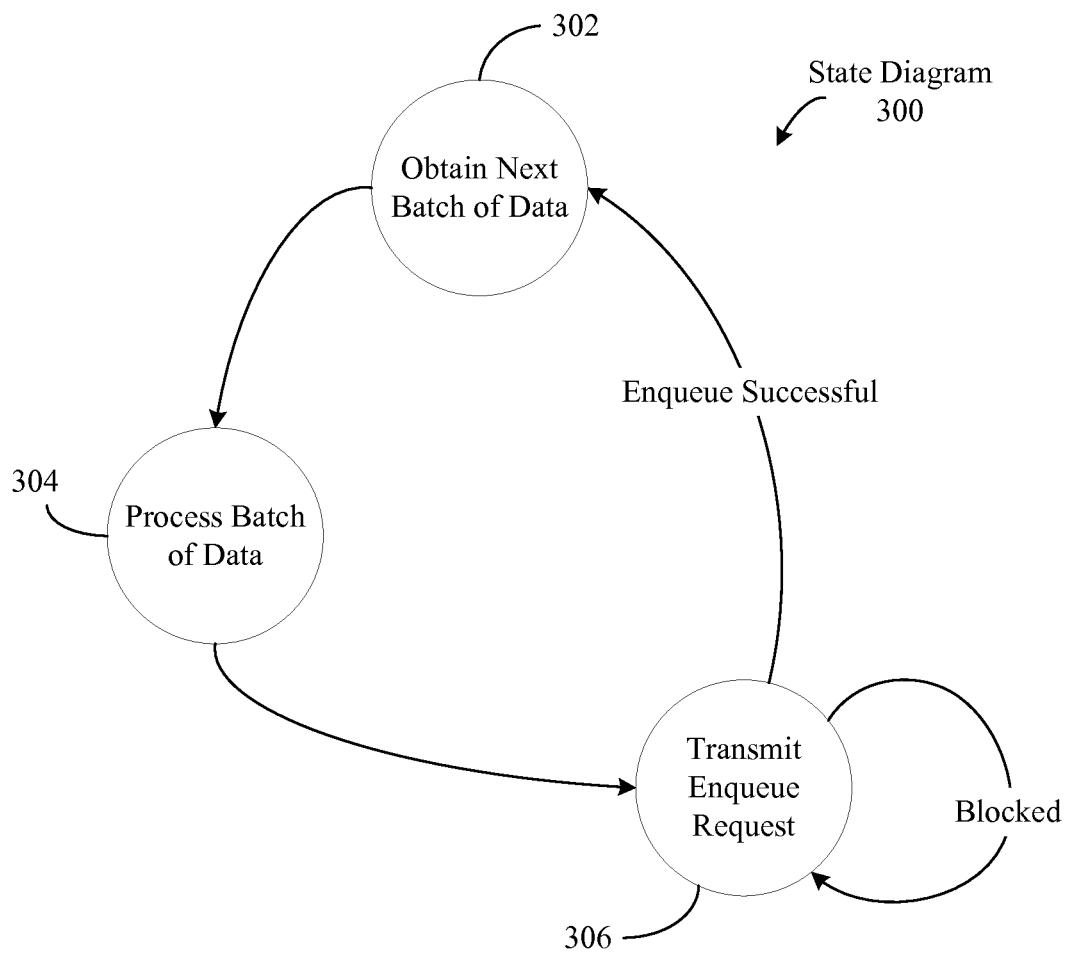
FIG. 3 is a state diagram illustrating the different states of a particular thread in the multi-threaded retrieval engine in accordance with an embodiment.

FIG. 3 is a state diagram 300 illustrating the different states of a particular thread in the multi-threaded retrieval engine 102 in accordance with an embodiment. In state 302, a thread in the multi-threaded retrieval engine 102 obtains a batch of training data records from a data producer 102. The thread then transitions to state 304. In state 304, the thread processes the batch of training data records. The processing may include decompressing the data, filtering the data, etc. The thread then transitions to state 306. In state 306, the thread transmits an enqueue request to the enqueue module 108. As discussed above, the enqueue module 108 will write the batch of training data records to a corresponding slot in the shared buffer 110 when the corresponding slot is available. If the corresponding slot is unavailable, the thread is blocked and remains in state 306 until the slot becomes available and the enqueue module 108 writes the data to the slot and unblocks the thread. Once the data is written to the slot, the thread transitions back to state 302.

Referring back to FIG. 1, the dequeue module 112 receives a dequeue request from the training data consumer 114 for a batch of training data records and, in response, transmits a next batch of training data records from the shared buffer 110 to the training data consumer. The dequeue module 112 treats each row of slots in the shared buffer 110 as a queue and, in response to dequeue requests, sequentially pops off the batches in a queue for transmission to the data consumer 114 until the end of the queue is reached. In one embodiment, the dequeue module 112 also transmits the batch index and the producer index associated with the batch to the data consumer 114. The transmission of a batch makes the slot in which the batch was stored available and unblocks any thread that was blocked as a result of the slot being previously unavailable.

The different queues 216 in the shared buffer 110 are illustrated in FIG. 2. When a shared buffer 110 has multiple queues, such as those illustrated in FIG. 2, the dequeue module 112 iterates over the queues when responding to dequeue requests. For example, in response to a first C dequeue requests, the dequeue module 112 sequentially transmits the batches in queue 216(0) to the data consumer 114. In response to the next C dequeue requests, the dequeue module 112 sequentially transmits the batches in queue 216(1) to the data consumer 114, and so forth. The batches transmitted to the training data consumer 114 have a deterministic order because those batches were stored by the enqueue module 109 in the shared buffer 110 in order.

In one embodiment, when dummy batches are inserted in the shared buffer 110 to account for data producers 102 having different numbers of training data records, the dequeue module 112 filters the dummy batches from transmission to the data consumer 114. Specifically, when the next batch to be dequeued is a dummy batch, the dequeue module 112 makes the slot storing the dummy batch available but, instead of transmitting the dummy batch to the data consumer 114, transmits the next batch after the dummy batch.

Figure 4:
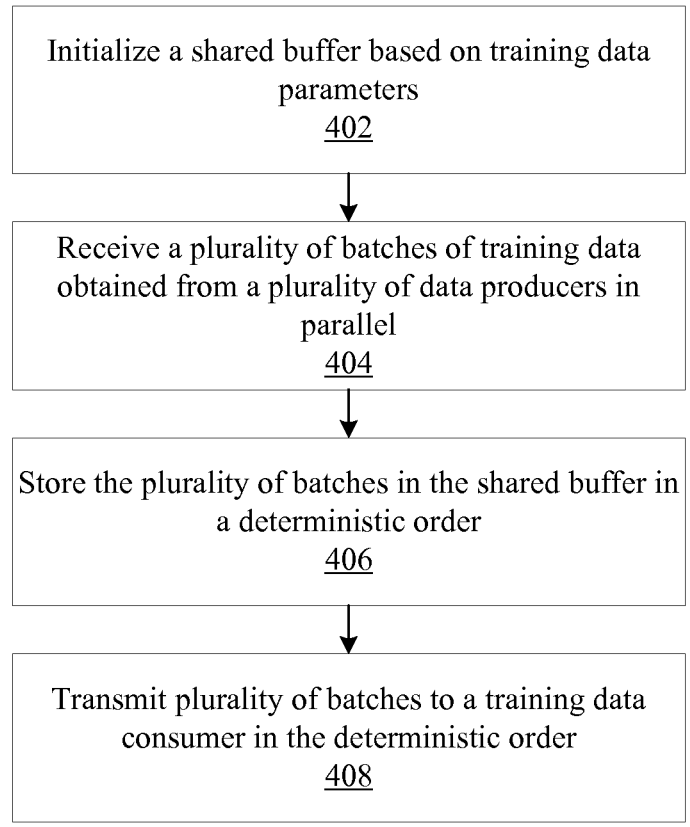
FIG. 4 is a flowchart of steps for distributing batches of training data obtained from data producers in parallel in accordance with an embodiment.

FIG. 4 is a flowchart of steps for distributing in a deterministic order batches of training data obtained from data producers in parallel in accordance with an embodiment. In some implementations, the steps are performed in an order other than the order presented in FIG. 4. Different and/or additional steps than those shown in FIG. 4 may be performed in some embodiments.

The enqueue module 108 in the sorting engine 106 initializes 402 a shared buffer based on training data parameters. The shared buffer includes a set of slots for each of a plurality of training data producers 102. The sets of slots are organized according to a deterministic order associated with the training data producers.

The enqueue module 108 receives 404 a plurality of batches of training data records obtained from the plurality of data producers 102 in parallel. In operation, the enqueue module 108 receives an enqueue request for each of the plurality of batches from the thread in the multi-threaded retrieval engine 106 assigned to the data producer 102 from which the batch was obtained. An enqueue request includes the batch as well as the producer index and the batch index associated with the first batch. Again, the producer index indicates the particular producer from which the first batch was obtained, and the batch index that indicates the storage location within the particular data producer 102 from which the first batch was obtained.

The enqueue module 108 stores 406 the plurality of batches in the shared buffer in the deterministic order associated with the plurality of training data producers 102. In operation, each of the batches corresponds to a particular slot in the shared buffer. When the slot is available, the enqueue module 108 writes the batch to the slot. When the slot is unavailable, the enqueue module 108 blocks the thread that obtained the batch until the slot becomes available. Once the slot becomes available, the enqueue module 108 writes the batch to the slot and unblocks the thread.

The dequeue module 112 transmits 408 the plurality of batches from the shared buffer to a training data consumer 114 in a deterministic order. In operation, a slot storing a batch of training data records becomes available when the batch is transmitted (also referred to as "dequeued") to the data consumer 114. Batches of training data records can only be dequeued in order, such that a previous batch in the order must be dequeued before a current batch can be dequeued.

Example Enqueuing to and Dequeuing from the Shared Buffer

Figure 5:
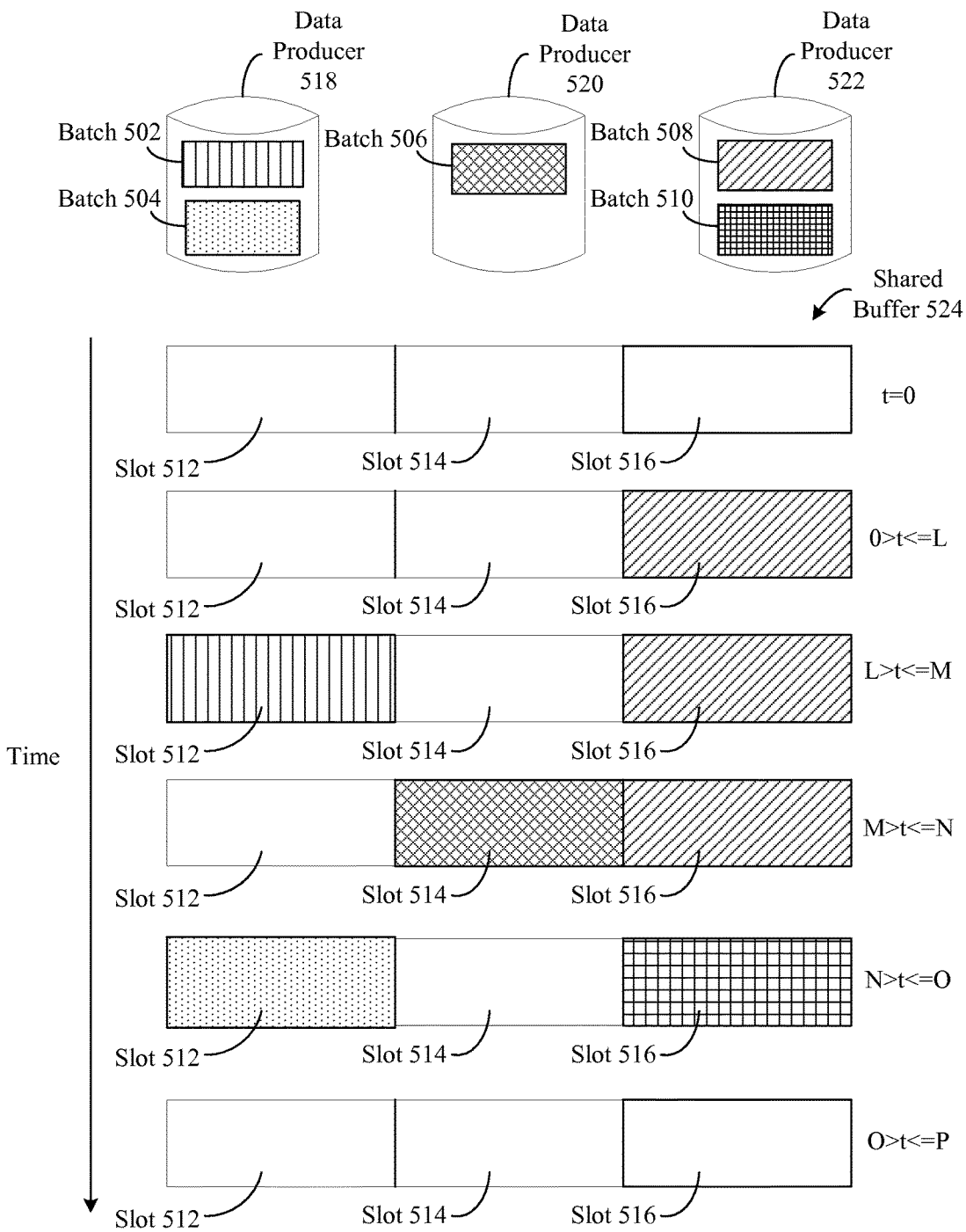
FIG. 5 illustrates an exemplary shared buffer to and from which batches of training data records are being enqueued and dequeued over time in accordance with an embodiment.

FIG. 5 illustrates an exemplary shared buffer 524 to and from which batches of training data records are being enqueued and dequeued over time in accordance with an embodiment. The shared buffer 524 includes three slots, slot 512, slot 514, and slot 516. Each of these slots is associated with one of three data producers from which data is concurrently being obtained by threads in the multi-threaded retrieval engine 104. In the illustrated example, slot 512 is associated with data producer 518, slot 514 is associated with data producer 520, and slot 516 is associated with data producer 522. Each of the slots 512, 514, and 516 can store a batch of training data records retrieved from the associated data producer.

For the purposes of discussion, assume that the multi-threaded retrieval engine 104 includes three threads, thread A, thread B, and thread C, that are concurrently obtaining batches of training data records from data producers 518, 520, and 522, respectively. At t=0, when the sorting engine 106 is initialized, each of the slots 512, 514, and 516 is empty. Thread A, B, and C have begun obtaining and processing the first batches of training data records stored in the data producers 518, 520, and 522.

At 0>t<=L, thread C, which was obtaining and processing batch 508 from data producer 522, transmits an enqueue request for batch 508 to the enqueue module 108. Because slot 516 is available, the enqueue module 108 writes batch 508 to slot 516. Even if the dequeue module 112 has received a dequeue request from the data consumer 114, batch 508 cannot be dequeued to the data consumer 114 yet, because slots 512 and 514 have not yet received their respective batches and releasing batch 508 would destroy the ordering of the batches.

At L>t<=M, thread A, which was obtaining and processing batch 502 from data producer 518, transmits an enqueue request for batch 502 to the enqueue module 108. Because slot 512 is available, the enqueue module 108 writes batch 502 to slot 512. If the dequeue module 112 receives a dequeue request from the data consumer 114, batch 502 can be dequeued to the data consumer 114 as it is the first batch in the batch order.

At M>t<=N, thread B, which was obtaining and processing batch 506 from data producer 520, transmits an enqueue request for batch 506 to the enqueue module 108. Because slot 514 is available, the enqueue module 108 writes batch 506 to slot 514. Also at M>t<=N, thread C, which was obtaining and processing batch 510, transmits an enqueue request for batch 510 to the enqueue module 108. Because slot 516 is unavailable, the enqueue module 108 blocks thread C until slot 516 becomes available for batch 510. If the dequeue module 112 receives one or more dequeue requests from the data consumer 114, batches 506 and 508 (previously written to slot 516) can be dequeued to the data consumer 114 as the two batches are next in the batch order.

At N>t<=O, thread A, which was obtaining and processing batch 504 from data producer 518, transmits an enqueue request for batch 504 to the enqueue module 108. Because slot 512 is available, the enqueue module 108 writes batch 504 to slot 512. Assuming that the dequeue module 112 received dequeued batch 508 from slot 516, the enqueue module 108 can also unblock thread C and write batch 510 to the slot 516.

At O>t<=P, each of the batches of the data producers 518, 520, and 522 have already been obtained and stored in the shared buffer 524. Therefore, threads A, B, and C are done. If the dequeue module 112 receives one or more dequeue requests from the data consumer 114, batches 504 and 510 can be dequeued to the data consumer 114 as the two batches are next in the batch order.

Table 1 illustrates the states of threads A, B, and C and then dequeues from the shared buffer 524 over time. Notice that even though the batches were written to the shared buffer 524 out of order, the order in which the batches were dequeued and transmitted to the data consumer 114 is deterministic: a batch from data consumer 518, followed by a batch from data consumer 520, followed by a batch from data consumer 522, and repeat.

TABLE 1

Enqueues and Dequeues Over Time

| Time | Thread A | Thread B | Thread C | Dequeue |
|---|---|---|---|---|
| t = 0 | Obtain/Process Batch 502 | Obtain/Process Batch 506 | Obtain/Process Batch 508 | N/A |
| 0 > t <= L | Obtain/Process Batch 502 | Obtain/Process Batch 506 | Enqueue Batch 508 | N/A |
| L > t <= M | Enqueue Batch 502 | Obtain/Process Batch 506 | Obtain/Process Batch 510 | N/A |
| M > t <= N | Obtain/Process Batch 504 | Enqueue Batch 506 | Enqueue Batch 510 (Blocked) | Dequeue Batch 502 |
| N > t <= O | Enqueue Batch 504 | Done | Enqueue Batch 510 | Dequeue Batches 506 and 508 |
| O > t <= P | Done | Done | Done | Dequeue Batches 504 and 510 |

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    receiving a plurality of batches of training data in parallel from a plurality of training data producers, the plurality of batches of the training data used by a training data consumer to train a machine learning model of the training data consumer over a plurality of iterations of the machine learning model, wherein an order in which the plurality of batches of the training data is received by the retrieval engine is different for each iteration of the plurality of iterations of the model;
    sorting the plurality of batches of the training data obtained from the plurality of training data producers in a shared buffer, the shared buffer comprising a set of slots configured to temporarily store the plurality of batches of the training data until each batch of the plurality of batches can be released to the training data consumer in a deterministic order that is repeatable for each iteration of the plurality of iterations of the machine learning model, each of the set of slots being organized in the deterministic order of the plurality of training data producers, wherein sorting each batch of the plurality of batches of training data received in parallel comprises:
        identifying a training data producer from which the batch was obtained;
        identifying one or more slots in the shared buffer associated with the identified training data producer; and
        temporarily storing the batch in the one or more identified slots of the shared buffer corresponding to the deterministic order, the deterministic order being independent from the order in which the plurality of batches is received from the plurality of training data producers; and
    transmitting each batch of the plurality of batches to the training data consumer in the deterministic order.

2. The method of claim 1, wherein the shared buffer includes a different set of slots for each of the plurality of training data producer, the sets of slots organized according to the deterministic order.

3. The method of claim 2, further comprising determining that the given slot corresponds to the first batch based on a batch index associated with a first batch, the batch index indicating a location within a first training data producer from which the first batch was obtained.

4. The method of claim 1, wherein each of the plurality of batches is obtained by a different thread executing in a multi-threaded execution environment.

5. The method of claim 4, wherein a first batch of the plurality of batches is obtained from a first data producer by a first thread, and further comprising:
    before transmitting the first batch to the training data producer, receiving a second batch obtained from the first producer by the first thread; and
    blocking the first thread until the first batch is transmitted to the training data consumer.

6. The method of claim 5, wherein blocking the first thread comprises:
    determining that a slot in the shared buffer where the second batch should be stored is occupied by the first batch.

7. The method of claim 2, further comprising:
    determining that no more batches are to be obtained from a first training data producer in the plurality of training data producers; and
    storing a dummy batch of data included in a first set of slots associated with the first training data producer.

8. The method of claim 1, wherein the training data consumer is a machine learning system configured to process the plurality of batches to infer one or more statistical relationships between data included in the plurality of batches.

9. A non-transitory computer-readable storage medium containing computer program code for:
    receiving a plurality of batches of training data in parallel from a plurality of training data producers, the plurality of batches of the training data used by a training data consumer to train a machine learning model of the training data consumer over a plurality of iterations of the machine learning model, wherein an order in which the plurality of batches of the training data is received by the retrieval engine is different for each iteration of the plurality of iterations of the model;
    sorting the plurality of batches of the training data obtained from the plurality of training data producers in a shared buffer, the shared buffer comprising a set of slots configured to temporarily store the plurality of batches of the training data until each batch of the plurality of batches can be released to the training data consumer in a deterministic order that is repeatable for each iteration of the plurality of iterations of the machine learning model, each of the set of slots being organized in the deterministic order of the plurality of training data producers, wherein sorting each batch of the plurality of batches of training data received in parallel comprises:
    identifying a training data producer from which the batch was obtained;
    identifying one or more slots in the shared buffer associated with the identified training data producer; and
    temporarily storing the batch in the one or more identified slots of the shared buffer corresponding to the deterministic order, the deterministic order being independent from the order in which the plurality of batches is received from each of the plurality of training data producers; and
    transmitting each batch of the plurality of batches to the training data consumer in the deterministic order.

10. The computer-readable storage medium of claim 9, wherein the shared buffer includes a different set of slots associated with each of the plurality of training data producers, the sets of slots organized according to the deterministic order.

11. The computer-readable storage medium of claim 10, further comprising determining that a given slot corresponds to a first batch based on a batch index associated with the first batch, the batch index indicating a location within a first training data producer from which the first batch was obtained.

12. The computer-readable storage medium of claim 9, wherein each of the plurality of batches is obtained by a different thread executing in a multi-threaded execution environment.

13. The computer-readable storage medium of claim 12, wherein a first batch of the plurality of batches is obtained from a first training data producer by a first thread, and further comprising:
   before transmitting the first batch to the training data producer, receiving a second batch obtained from the first training data producer by the first thread; and
   blocking the first thread until the first batch is transmitted to the training data consumer.

14. The computer-readable storage medium of claim 13, wherein blocking the first thread comprises:
   determining that a slot in the shared buffer where the second batch should be stored is occupied by the first batch.

15. The computer-readable storage medium of claim 10, further comprising:
   determining that no more batches are to be obtained from a first training data producing computer system in the plurality of training data producing computer systems; and
   storing a dummy batch of data included in a first set of slots associated with the first training data producing computer system.

16. The computer-readable storage medium of claim 9, wherein the training data consuming computer system is a machine learning system configured to process the plurality of batches to infer one or more statistical relationships between data included in the plurality of batches.

17. A system, comprising:
   a plurality of training data producers producing a plurality of batches of training data, the plurality of batches of the training data used by a training data consumer to train a machine learning model of the training data consumer over a plurality of iterations of the machine learning model, wherein an order in which the plurality of batches of the training data is received is different for each iteration of the plurality of iterations of the model;
   a shared buffer for temporarily storing batches of training data obtained from the plurality of training data producing computer systems, the shared buffer comprising a set of slots configured to temporarily store the plurality of batches of the training data until each batch of the plurality of batches can be released to the training data consumer in a deterministic order that is repeatable for each iteration of the plurality of iterations of the machine learning model; and
   a training data sorting engine comprising a computer readable medium containing computer program code configured to:
   receive the plurality of batches of training data obtained from each of the plurality of training data producers in parallel in an order different relative to the deterministic order;
   for each batch of the plurality of batches of training data received in parallel,
   identifying a training data producer from which the batch was obtained;
   identifying one or more slots in the shared buffer associated with the identified training data producer; and
   temporarily storing the batch in the one or more identified slots of the shared buffer corresponding to the deterministic order, the deterministic order being independent from the order in which the plurality of batches is received from the plurality of training data producers; and
   transmit each batch of the plurality of batches to the training data consumer in the deterministic order.

18. The system of claim 17, wherein the shared buffer includes a different set of slots associated with each of the plurality of training data producers, the sets of slots organized according to the deterministic order.

* * * * *